3,819,721
PREPARATION OF HALOADAMANTANES
Robert E. Moore, Wilmington, Del., and Gary L. Driscoll, Delaware, Pa., assignors to Sun Research and Development Co., Philadelphia, Pa.
No Drawing. Filed Dec. 17, 1968, Ser. No. 784,480
Int. Cl. C07c 35/22
U.S. Cl. 260—617 F          33 Claims

ABSTRACT OF THE DISCLOSURE

Halogenated derivatives containing the adamantane nucleus are produced by admixing, in the presence of strong sulfuric acid, monools or diols of adamantanes or alkyladamantanes with a selected halo-yielding salt of an alkali or alkaline earth metal, or a corresponding hydrogen halide.

BACKGROUND OF THE INVENTION

This invention relates to the conversion of monools and diols of adamantane hydrocarbons of the $C_{10}$–$C_{30}$ range to bridgehead halo compounds. The products of the reaction are monohalo, dihalo and/or monohydroxymonohalo derivatives having the same carbon skeletal structure as the starting compounds.

The adamantane nucleus has ten carbon atoms, four of which are bridgehead carbons that are equivalent to each other, as can be seen from the following typographical representation:

As shown, the bridgehead carbon atoms customarily are designated by the numerals 1, 3, 5 and 7 respectively.

The preparation of methyl- and/or ethyl-substituted adamantanes by the isomerization of tricyclic naphthenes by means of an aluminum halide or HF-BF$_3$ catalyst has been described by several references including the following: Schneider U.S. Pat No. 3,128,316, dated Apr. 7, 1964; Janoski and Moore U.S. Pat. No. 3,275,700, dated Sept. 27, 1966; Schleyer et al., Tetrahedron Letters No. 9, pps. 305–309 (1961); and Schneider et al., JACS, vol. 86, pps. 5365–5367 (1964). The isomerization products can have the methyl and/or ethyl groups attached to the adamantane nucleus at either bridgehead or nonbridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes, trimethyladamantanes and tetramethyladamantanes.

Preparations of adamantane hydrocarbons having higher alkyl substituents have been described in the following references: Schneider U.S. Pat. No. 3,382,288, dated May 7, 1968; Spengler et al., Erdöl und Kohle-Erdgas-Petrochemie, vol. 15, pp. 702–707 (1962); and Hoek et al., 85, (1966), Recueil, 1045–1053.

Monohydroxy and dihydroxy derivatives of adamantane and alkyladamantanes have various sources. For instance, see Schneider U.S. Pat. Nos. 3,356,740 and 3,356,741, both dated Dec. 5, 1967; Moore U.S. Pat. No. 3,383,424, dated May 14, 1968; Stetter and Wulff, Chem. Ber., vol. 93, p. 1366 (1960); and Smith and Williams, J. Org. Chem., vol. 26, pp. 2207–2212 (1961).

SUMMARY OF THE INVENTION

The invention resides in a process for producing halo compounds having any of the formulas: D–A–X; X–A–X; and X–A–OH, wherein A represents a hydrocarbon moiety consisting of the adamantane nucleus with 0–3 alkyl substituents containing a total of not more than 20 alkyl carbon atoms; wherein not more than 2 such alkyl substituents of A occupy bridgehead positions on said nucleus; wherein X is a bridgehead substituent which is chloro, bromo or iodo; and wherein D is a bridgehead substituent which is hydrogen or alkyl, remaining substituents on A being hydrogen.

Said process is carried out by admixing, in the presence of sulfuric acid having a strength in the range of 80–112% $H_2SO_4$ equivalent by weight, and more preferably 90–107% $H_2SO_4$ equivalent, a halogenating agent which is a chloride, bromide or iodide of lithium, sodium, potassium, rubidium, cesium, magnesium, calcium, strontium, barium or hydrogen, with a monool or diol of an adamantane hydrocarbon having the formula: C–A–OH wherein A represents the same hydrocarbon moiety as above; wherein OH is a bridgehead or nonbridgehead hydroxy substituent; and wherein C is a bridgehead or nonbridgehead substituent which is hydrogen or alkyl having 1–10 carbon atoms, or a bridgehead or nonbridgehead hydroxy substituent, remaining substituents on A being hydrogen; and thereafter recovering from the reaction mass one or more bridgehead halo products corresponding to the formulas: D—A—X; X—A—X; and X—A—OH. In other words the reaction converts the starting adamantane compound which is a monool or diol to a monohalo, a dihalo and/or a monohydroxymonohalo derivative thereof with these substituents being located at bridgehead positions on the adamantane nucleus.

For purposes of the present invention, monools or diols of adamantane hydrocarbons having one or more cycloalkyl groups on the nucleus are essentially equivalent as starting materials to corresponding monools or diols having non-cyclic saturated substituents of the same number of carbon atoms. Thus any cycloalkyl substituents on the adamantane nucleus will contain up to 10 carbon atoms as is the case with the alkyl substituents.

DESCRIPTION

Alkyl groups attached to the adamantane nucleus of the monool or diol reactant can be located at bridgehead or nonbridgehead positions. However, a maximum of three bridgehead positions on said nucleus can be occupied by alkyl groups leaving one bridgehead position open to be occupied either by hydroxy or by hydrogen when the reactant has a nonbridgehead hydroxy group, the product in either case being limited to a bridgehead monohalo compound. In this particular situation, C (and likewise D) is a bridgehead alkyl substituent, and moiety A per se (as defined) provides two alkyl groups occupying bridgehead positions on the adamantane nucleus, with a possible third alkyl group occupying a nonbridgehead position.

Moiety A, as defined, being limited to two bridgehead alkyl substituents, when C is hydrogen or hydroxy, two bridgedhead positions are made available for reaction in the production of 1-halo, 1-halo-3-hydroxy and/or 1,3-dihalo compounds in accordance with the invention.

1-Hydroxy-3-ethyl-5,7-dimethyladamantane and 1-hydroxy-3,5,7-trimethyladamantane are examples of monools with three bridgehead positions on the adamantane nucleus occupied by alkyl groups, with the fourth bridgehead position occupied by hydroxy for reaction in accordance with the invention. In this instance, moiety A per se provides two bridgehead alkyl groups, and C in the formula C—A—OH provides a third alkyl group. The hydroxy group originally can, of course, occupy a nonbridgehead position, since it will immediately isomerize to the bridgehead position in the presence of the strong acid used in the present reaction.

1,3-Dihydroxy-5,7-dimethyladamantane is an example of a diol with two bridgehead positions on the adamantane nucleus occupied by alkyl groups, these being supplied by moiety A, and C becomes hydroxy. This compound appears as an intermediate in the reaction when one or both hydroxy groups originally occupy non-bridgehead positions in view of the isomerization reaction referred to above.

1-Hydroxy-3,5-dimethyladamantane is an example of a monool wherein C simply is hydrogen, and this compound likewise appears as an intermediate for reaction should the hydroxy group originally occupy a nonbridgehead position.

Additional examples of starting material compounds in the practice of the invention are the monools and diols of any of the following hydrocarbons, hydroxy groups being attached to the adamantane nuclei at either or both bridgehead and nonbridgehead positions: 1-methyl or 2-methyladamantane; 1-ethyl or 2-ethyladamantane; 1,2- or 1,3- or 1,4-dimethyladamantane; 1-ethyl-3-methyladamantane; diethyladamantanes; 1,2,5-trimethyladamantane and other nonbridgehead trimethyladamantanes having one or more nonbridgehead methyl groups; 1-n-propyl or 1-isopropyladamantane; 1-n-butyladamantane; 1,3-di-n-pentyladamantane; 1-cyclopentyl or 1-cyclohexyladamantane; 1-methyl-3-heptyladamantane; 1-n-decyladamantane; 1-n-decyl-3-ethyladamantane; 1,3-dicyclohexyladamantane; 1-n-hexadecyladamantane; 1 - eicosyladamantane and the like. Other examples can be found in the reference cited above.

Typical products are 1-chloroadamantane; 1-bromoadamantane; 1-iodoadamantane; 1-chloro-3-hydroxyadamantane; 1,3-dichloroadamantane; 1-bromo - 3 - hydroxyadamantane; 1,3-dibromoadamantane; 1-iodo-3-hydroxyadamantane; 1,3-diiodoadamantane; and corresponding alkyl-substituted adamantanes.

The invention is outstanding advantageous when employing salts of the metals set forth above, for in such instance the reaction is very clean and the handling of corrosive and highly toxic elemental halogens, or, by choice, even their acids is avoided. Moreover, the process lends itself admirably to the use of a very low-cost source of halogen reactant, for example, common salt (NaCl).

On the other hand, the acids of the halogens listed can be employed, with the handling inconvenience thus encountered balanced against halogen reactant cost, which not infrequently can be made quite low, such as when the halogen acid, e.g., HCl, is a by-product of some other reaction.

Moreover, insofar as the production of monohydroxymonohalo product is concerned, the invention provides a very convenient means for forming difunctional derivatives with two different functional substituents.

Preferably, the hydrocarbon moiety A in the hydrocarbon reactant has 0–10 total alkyl carbon atoms (in addition to the ten carbon atoms in the nucleus). Also it is preferred that the hydrocarbon moiety A in the hydrocarbon reactant contain just two alkyl groups, each having 1 or 2 carbon atoms, and each occupying a bridgehead position.

The halogenated products resulting from the invention have a wide variety of uses. For example, monohalo products prepared according to the invention can be used as starting material for the preparation of methoxyalkyladamantanes as described in Moore U.S. Pat. No. 3,383,423, dated May 14, 1968. Dihalo products of the invention can be used to prepare 1,3-dicarboxyadamantanes in the manner disclosed in Moore U.S. Pat. No. 3,356,718, dated Dec. 5, 1967. The monohalomonohydroxy products can be pyrolyzed to produce 5-methylene-1-ketobicyclo[3.3.1] nonane as such or in alkyl-substituted form, as described and claimed in Duling and Driscoll U.S. application Ser. No. 756,604, filed Aug. 30, 1968. In turn, the latter products find utility in the preparation of polyethers by treatment with acids in inert solvents to yield a thermally stable film-forming polymer useful for high temperature electrical insulation.

The products of the present invention are prepared from adamantyl and alkyladamantyl monools and diols. These compounds are reacted with hydrogen chloride, hydrogen bromide, hydrogen iodide, or by decided preference for the reasons set forth above, an alkali metal or alkaline earth metal salt thereof as set forth above, in the presence of strong sulfuric acid of strength in the range of 80–112% $H_2SO_4$ equivalent, moer preferably 90–107% $H_2SO_4$, with 95–105% $H_2SO_4$ generally being the most useful range. Upon diluting the resulting reaction mass with water, the desired halogenated compound or compounds can be recovered from the reaction mixture, e.g., by filtration or solvent extraction.

As an alternative procedure, the monohalo and dihalo products can be recovered from the reaction mass without dilution with water, by extraction from the reaction mixture by means of an inert solvent such as pentane or hexane, followed by evaporation of the solvent. Any hydroxyhalo product present in the mixture remains with the undiluted acid phase and is not extracted. If desired, the monohalo product can be separated from the dihalo product by distilling the monohalo material out of the extract.

The monohalo and dihalo products, and especially the latter, tend to have low solubility in the undiluted acid and hence often are recoverable at least in part from the reaction mixture by decantation and/or filtration without any usage of solvent. On the other hand, the monohalomonohydroxy products remain in the acid phase until it has been diluted with water.

The dihalo products generally are solids at room temperature while the monohalo products may be solid or liquid depending upon the particular adamantane hydrocarbon used as starting material. For example, the bridgehead monohalo and dihalo derivatives of 1,3-dimethyladamantane are, respectively, liquid and solid at room temperature; whereas for adamantane both the monohalo and dihalo bridgehead derivatives are normally solids. Hence the work-up procedure employed following the reaction may vary depending upon the nature of particular product compounds made.

The reaction is versatile from the standpoint of the production of desired primary products, the major product in the reaction mass depending upon the molar ratio of halogenating reactant to monool or diol reactant and upon the strength of sulfuric acid employed.

To illustrate, assuming product recovery involves dilution with water, with lower acid concentrations and with the above-mentioned molar ratio around 1:1, monohalo substitution is favored. However, monohalomonohydroxy product can be produced from a monool, provided that the monool has a bridgehead substituent that is hydrogen, i.e., when C in the formula C—A—OH is hydrogen. In such case, it is found that as sulfuric acid concentration increases from the minimum of 80%, the capacity of the reaction to convert bridgehead hydrogen to hydroxy also increases, with the result that when sulfuric acid concentration approaches say 99%, reaction conditions becomes more and more favorable for the production of monohydroxymonohalo product. With acid strengths in the range of 99–107% $H_2SO_4$ and particularly at strengths of at least 102%, production of the monohydroxymonohalo product from a monool (C being hydrogen) can be maximized by maintaining the molar ratio of halogenating reactant to monool at 1:1, and production of the dihalo product can be maximized by maintaining such ratio in excess of 2:1.

Somewhat similar considerations apply in the case of a dihydroxy reactant, in that lower sulfuric acid concentration, and lower molar ratios of halogenating reactant to diol, favor conversion of a single hydroxy group to halo, and in that as sulfuric acid concentration increases from the minimum of 80%, and as the molar ratio of halogenating reactant to diol increases beyond 1:1, the capacity of the reaction to convert the second hydroxy group to halo also increases, with the result that as sulfuric acid concentration approaches say 95% and the above molar ratio approaches 2:1, conditions become more and more favorable for the production of dihalo product.

Mixtures of the three types of products, D—A—X, X—A—X and X—A—OH, are frequently produced, which can be separated and worked up to obtain the individual products by procedures as indicated above.

Thus both acid strength and molar ratio of halogenating reactant to monool or diol play an important part in product distribution in the reaction mass, leading to the following preferences.

In the production of monohalo product from a monool, a sulfuric acid strength of 90-98%, and particularly at least 95%, $H_2SO_4$ equivalent by weight, along with a molar ratio of halogenating reactant to monool of 1:1 or thereabouts or more particularly somewhat in excess of 1:1, such as in the range of 1:1 to 1.5:1, is preferred.

In the production of monohydroxymonohalo product from a monool, a sulfuric acid strength of 99-107%, and particularly at least 102%, $H_2SO_4$ equivalent by weight, along with a molar ratio of halogenating reactant to monool of 1:1, or thereabouts, is preferred.

In the production of dihalo product from a monool, a sulfuric acid strength of 99-107%, and particularly at least 102%, $H_2SO_4$ equivalent by weight, along with a molar ratio of halogenating reactant to monool of 2:1 or more particularly somewhat in excess of 2:1, such as in the range of 2:1 to 3:1, is preferred.

In the production of monohydroxymonohalo product from a diol, a sulfuric acid strength of 98-105%, and particularly 98-102%, $H_2SO_4$ equivalent by weight, along with a molar ratio of halogenating reactant to diol of 1:1 or thereabouts is preferred.

And in the production of dihalo product from a diol, a sulfuric acid strength of 99-102% $H_2SO_4$ equivalent by weight, along with a molar ratio of halogenating reactant to diol of 2:1 or more particularly somewhat in excess of 2:1, such as in the range of 2:1 to 3:1, is preferred.

By way of example, 1,3-dihydroxy-3,5-dimethyladamantane is reacted with a halo-yielding compound of the kind described above, each reactant initially by preference and for practical purposes in virtually anhydrous form, in the presence of strong sulfuric acid (e.g., 95-105% $H_2SO_4$ equivalent), and the reaction product is then diluted with water. As brought out above, the product is primarily monohydroxymonohalo or dihalo, depending upon the molar ratio of halo-yielding reactant to diol reactant, and upon sulfuric acid strength. At a strength, for example, of 100% $H_2SO_4$ and a molar ratio of 1.5:1, both the monohydroxymonohalo and the dihalo derivatives would be obtained in substantial yields. Upon filtration, a solid mixture is obtained from which the individual products can be selectively recovered, e.g., by solvent extraction. For instance, the 1,3-dihalo-5,7-dimethyladamantane, being soluble in hydrocarbon solvents such as hexane, can be selectively extracted by means of such solvent from the 1-halo-3-hydroxy-5,7-dimethyladamantane which is substantially insoluble in hexane. The latter product can be selectively extracted from any unreacted diol by extracting the residue in an ether, such as diethyl ether.

The major reaction which occurs when the molar ratio of halo-yielding reactant to dihydroxy reactant does not greatly exceed 1:1, and the sulfuric acid strength is in the range of say 98-100% $H_2SO_4$ equivalent by weight, can be illustrated as follows:

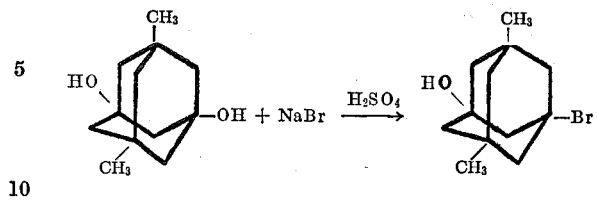

Ordinarily, some dibromo product will also be present.

In effecting reaction, the sulfuric acid should have a high enough acid strength and be used in large enough amount for the desired reaction to take place. Generally speaking, lower acid strengths, and lesser amounts thereof, other things being the same, favor monohalo substitution. In all cases the strength of the starting acid should be of at least 80% $H_2SO_4$ equivalent by weight, and preferably should be considerably higher such as at least 95%. Regulation of molar ratio of reactants affords considerable leeway in acid strength. Accordingly, acid concentrations in the range of 80-112% can be employed, the range of 95-105% being particularly useful, and while any desired volume ratio of sulfuric acid to the starting adamantane compound can be employed, a volume ratio in the range of 1:1 to 15:1 is quite satisfactory, with 3:1 to 10:1 preferred.

With either a monool or diol as starting material, it is desirable first to dissolve this reagent in the strong sulfuric acid. This can be done merely by adding the monool or diol to the sulfuric acid and stirring for several minutes. The temperature of the mixture should be between the freezing point of the acid (circa 8-10° C.) and say 75° C., with a temperature in the lower part of this range usually being preferable. As the monool or diol goes into solution, some release of heat occurs but the exotherm is relatively mild. After this reactant has been dissolved, the halogenating reactant is added slowly to the mixture while agitating the same, until an appropriate ratio thereof to the monool or diol is reached. The product or products can then be recovered by procedures as previously discussed.

Temperature conditions maintained during the reaction follow the well-known rule, namely, other conditions remaining the same, they should be sufficiently high for the reaction to take place, preferably at a reasonable rate, and not so high as to result largely in unwanted products, such as decomposition products, and preferably not significantly in such products. Higher temperatures are permissible, and may be required for a reasonable rate of reaction when employing lower sulfuric acid strengths, e.g., 80-90% $H_2SO_4$, whereas reduced temperatures are recommended when employing relatively high sulfuric acid strengths. Thus, for example and generally speaking, the reaction can be carried out under temperature conditions virtually between the freezing point of the acid and say 75° C., but it is usually desirable to maintain temperature conditions in the range of 10-30° C. A good practical operating rule is to decrease reaction temperature conditions with increase in sulfuric acid strength.

After the first phase of the process has been completed, the reaction mass can be diluted with water to initiate the second phase, i.e., separation of the desired products. This is conveniently accomplished by pouring the strongly acidic mass over cracked ice or into ice water of effect dilution while simultaneously preventing the temperature from rising an inordinate amount. Enough water (e.g., ice) ought to be used to adequately decrease the strength of the sulfuric acid so that the desired dilution will proceed to conclusion. Generally, the strength of the acid ought to be brought down to less than 60% $H_2SO_4$ by weight and, if desired, to considerably less than this level (e.g., below 20% $H_2SO_4$). When the acid is sufficiently diluted all reaction products become insoluble and will precipitate. The product or products can be separated from the reaction mass by any suitable means, such as filtration and/or decantation.

On the other hand, in recovering the monohalo and dihalo products, the step of dilution with water can be omitted, and such product or products can be separated from the reaction mass by solvent extraction as previously described.

The following examples are given by way of illustration.

Example 1

19.6 g. (0.1 mole) of 1,3-dihydroxy-5,7-dimethyladamantane (for convenience, "DMA") was dissolved in a cold mixture of 96% sulfuric acid (50 ml.) and 20% fuming sulfuric acid (50 ml.). Stated differently, the sulfuric acid strength, prior to the addition of diol, was 102% $H_2SO_4$ equivalent by weight. Sodium bromide (10.3 g.=0.1 mole) was added, thus providing a 1:1 molar ratio of halogenating reagent to diol, and the mixture was stirred for 15 minutes at a temperature of about 10–15° C. The mixture was then poured over ice and stirred until the ice melted. The resulting solid was filtered from the aqueous layer and thoroughly washed with water. The solid was then extracted with hexane to selectively remove 1,3-dibromo-5,7-DMA, identified by infrared spectrum and melting point (113–114° C.). It was then extracted with diethyl ether to selectively dissolve 1-hydroxy-3-bromo-5,7-DMA, identified by infrared spectrum and comparison with authentic material. The minor amount of resulting white residue was found to be unreacted diol. Yields of these product components on a molar basis were approximately as follows:

| | Percent |
|---|---|
| 1,3-dihydroxy-5,7-DMA | 20 |
| 1-hydroxy-3-bromo-5,7-DMA | 60 |
| 1,3-dibromo-5,7-DMA | 20 |

1,3-Dihydroxy-5,7-DMA (19.6 g.=0.1 mole) was slowly added to a mixture of 100 ml. of 96% sulfuric acid and 100 ml. of 20% fuming sulfuric acid which had been cooled to 10° C. ($H_2SO_4$ equivalent of mixture= 102%). To the clear, colorless mixture, sodium bromide (20.6 g.=0.20 mole) was added in approximately 1 gram portions with cooling. Molar ratio of halogenating reagent to diol was 2:1. The mixture became viscous and some precipitate could be observed. After 15 minutes of stirring, the mixture was poured over 1000 ml. of cracked ice, the mixture at times assuming a reddish color. After the ice was melted, a white solid was filtered from the liquid and washed thoroughly with distilled water. After drying, 31.2 g. (97% of theory) of 1,3-dibromo-5,7-DMA was obtained. This was identified by comparison of its infrared spectrum with that of authentic material.

Example 3

1,3-Dihydroxy-5,7-DMA (9.8 g.=0.05 mole) was slowly added to a mixture of 100 ml. of 96% sulfuric acid and 100 ml. of 20% fuming sulfuric acid at room temperature. To the clear, colorless mixture sodium chloride (5.8 g.=0.1 mole) was added in portions. The mixture became slightly viscous and apparently contained some precipitate. After 30 minutes, the mixture was poured over ice to recover the product. The resulting white solid was filtered from the aqueous layer and washed thoroughly with water. After drying, 11.1 g. (95% of theory) of 1,3-dichloro-5,7-DMA was obtained. It was identified by its infrared spectrum and melting point.

Example 4

1,3-Dihydroxy-5,7-DMA (9.8 g.=0.05 mole) was slowly added to a mixture of 100 ml. of 96% sulfuric acid and 100 ml. of 20% fuming sulfuric acid at 10° C. Anhydrous, gaseous hydrogen chloride was slowly bubbled through the mixture until it appeared that it was no longer being retained. This required 20 minutes and the addition was continued for an additional 10 minutes to insure sufficient hydrogen chloric being added. The resulting mixture was poured over ice and the 1,3-dichloro-5,7-DMA was recovered by filtering and washing as before. The yield was 11.0 g. (94.5% of theory).

Example 5

To a 3-neck 500 ml. round bottom flask were charged 180 cc. of 96% $H_2SO_4$. The flask and contents were cooled to 10° C., and 1-hydroxy-3,5-DMA (18 g.=0.1 mole) was added with thorough stirring over a period of 15 minutes. The alcohol having been dissolved in the sulfuric acid, sodium chloride (7.02 g.=0.12 mole) was added with thorough stirring over a period of 15 minutes. Thereafter stirring was continued for an additional 15 minutes. The contents of the flask were then poured into 500 cc. of ice water, and the aqueous mass was extracted with diethyl ether. The ether extract was dried and evaporated to remove the ether, whereupon the liquid residue was subjected to distillation under reduced pressure to recover 1-chloro-3,5-DMA, a water white liquid, in >95% yield.

Example 6

Example 5 was repeated in all respects except that sodium bromide was substituted for sodium chloride, while maintaining the same molar ratio of monool to halogenating reactant, i.e., 1:1.2. As a result of the final step of distillation, 1-bromo-3,5-DMA, a liquid, was recovered in >95% yield.

Example 7

0.1 mole of 1-hydroxy-3-ethyl-5,7-DMA was charged to a cooled flask containing 180 cc. of 96% $H_2SO_4$ with thorough stirring. After solution of the alcohol, 0.12 mole of sodium bromide was added slowly with thorough stirring until reaction was complete. The reaction mass was then poured into ice water, with precipitation of a solid which was thoroughly washed with water. Upon drying of the solid, analysis showed that 1-bromo-3-ethyl-5,7-DMA (m.p. 37° C.) was obtained in good yield.

Example 8

In this example the procedure of Example 7 was followed, except that 1-hydroxy-3,5,7-trimethyladamantane was substituted for the monool used in Example 7. The product, 1-bromo-3,5,7-trimethyladamantane (m.p. 36° C.) was obtained in good yield.

Example 9

This example is similar to Example 5 except that stronger acid (104.5% $H_2SO_4$ equivalent) and a greater molar proportion (2.1:1) of NaCl to 1-hydroxy-3,5-DMA was used. Otherwise the reaction conditions and procedure were essentially the same. The product obtained after mixing the reaction mass with ice and filtering comprised 1,3-dichloro-5,7-DMA as the main component with minor but substantial amounts of 1-chloro-3,5-DMA and 1-hydroxy-3-chloro-5,7-DMA.

Substantially analogous results are obtained when other compounds having the adamantane nucleus and the formula C—A—OH as above defined are substituted as starting material in the above Examples, and the same applies to the substitution in the Examples of other halo-yielding metal salts of the character set forth herein as well as the hydrogen halides.

The invention claimed is:
1. Process for producing halo compounds having the adamantane nucleus which comprises admixing, in the presence of sulfuric acid having a strength in the range of 80–112% $H_2SO_4$ equivalent by weight and at a temperature between the freezing point of the acid and 75° C., a halogenating reagent which is hydrogen chloride, hydrogen bromide, hydrogen iodide or a metal salt which is a chloride, bromide or iodide of lithium, sodium, potassium, rubidium, cesium, magnesium, calcium, strontium, or barium, with an adamantane derivative having the formula C—A—OH wherein A represents a hydrocarbon moiety consisting of the adamantane nucleus with 0–3 alkyl or cycloalkyl substituents containing a total of not more than 20 alkyl or cycloalkyl carbon atoms; wherein not more than 2 such alkyl or cycloalkyl substituents of A occupy bridgehead positions on the nucleus; wherein OH is a bridgehead or nonbridgehead hydroxy substituent attached to the adamantane nucleus; and wherein C is a bridgehead substituent which is hydrogen, alkyl having 1–10 carbon atoms or cycloalkyl having up to 10 carbon atoms, the remaining substituents on A being hydrogen; and thereafter recovering from the reaction mass at least one bridgehead halo compound having the formula C—A—X, wherein A and C are as above specified, and X is a bridgehead halogen substituent.

2. The process of Claim 1 wherein the sulfuric acid strength falls in the range of 90–107% $H_2SO_4$, equivalent by weight.

3. The process of Claim 2 wherein said temperature is in the range of 10–30° C.

4. The process of Claim 2 wherein the halogenating reagent is a metal salt.

5. The process of Claim 4 wherein the halogenating reactant is sodium chloride or sodium bromide.

6. The process of Claim 2 wherein the halogenating reactant is a hydrogen halide.

7. The process of Claim 2 wherein the OH substituent occupies a bridgehead position on the adamantane nucleus.

8. The process of Claim 7 wherein the sulfuric acid strength is 90–98% $H_2SO_4$, and the molar ratio of halogenating reactant to said adamantane derivative is in the range of 1:1 to 5:1.

9. The process of Claim 7 wherein the adamantane nucleus has two alkyl or cycloalkyl substituents each occupying a bridgehead position and containing a total of not more than 10 carbon atoms.

10. The process of Claim 9 wherein the substituents are alkyl and each alkyl substituent on the adamantane nucleus contains one or two carbon atoms.

11. The process of Claim 10 wherein the halogenating reactant is sodium chloride or sodium bromide.

12. The process of Claim 1 wherein the recovery of product from the reaction mass involves diluting said mass with water.

13. The process of Claim 1 wherein the sulfuric acid strength is 95–105% $H_2SO_4$, said temperature is in the range of 10–30° C., and the molar ratio of halogenating reactant to said adamantane derivative is in the range of 1:1 to 3:1.

14. The process of Claim 13 wherein the halogenating reactant is a metal salt.

15. The process of Claim 14 wherein the halogenating reactant is sodium chloride or sodium bromide.

16. The process of Claim 14 wherein the recovery of product from the reaction mass involves diluting said mass with water.

17. Process for producing halo compounds having the adamantane nucleus which comprises admixing, in the presence of sulfuric acid having a strength in the range of 80–112% $H_2SO_4$ equivalent by weight and at a temperature between the freezing point of the acid and 75° C., a halogenating reactant which is hydrogen chloride, hydrogen bromide, hydrogen iodide or a metal salt which is a chloride, bromide or iodide of lithium, sodium, potassium, rubidium, cesium, magnesium, calcium, strontium, or barium, with an adamantane derivative having the formula HO—A—OH wherein A represents a hydrocarbon moiety consisting of the adamantane nucleus with 0.3 alkyl or cycloalkyl substituents containing a total of not more than 20 alkyl or cycloalkyl carbon atoms; wherein not more than 2 such alkyl or cycloalkyl substituents of A occupy bridgehead positions on said nucleus; where-in the OH's are bridgehead or nonbridgehead hydroxy substituents attached to the adamantane nucleus, the remaining substituents on A being hydrogen; and thereafter recovering from the reaction mass at least one bridgehead halo compound having a formula selected from (a) X—A—X ,and (b) X—A—OH, wherein A is as above specified, X is a bridgehead halogen substituent, and OH is a bridgehead hydroxy substituent.

18. The process of Claim 17 wherein the sulfuric acid strength falls in the range 90–107% $H_2SO_4$ equivalent by weight.

19. The process of Claim 18 wherein the temperature is in the range of 10–30° C.

20. The process of Claim 18 wherein the halogenation reactant is a metal salt.

21. The process of Claim 20 wherein the halogenation recatant is sodium chloride or sodium bromide.

22. The process of Claim 18 wherein the hydrogenation reagent is a hydrogen halide.

23. The process of Claim 18 wherein both of the OH substituents occupy a brideghead position on the adamantane nucleus.

24. The process of Claim 23 wherein the sulfuric acid strength is 98–105% $H_2SO_4$, the molar ratio of halogenation reactant to said adamantane derivative is about 1:1, and a derivative of the formula X—A—OH is recovered from the reaction mass, X being bridgehead halogen and OH being bridgehead hydroxy.

25. The process of Claim 23 wherein the sulfuric acid strength is 99–102% $H_2SO_4$, the molar ratio of halogenating reagent to said adamantane is in the range of from 2:1 to 3:1 and a dihalo derivative of the formula

is recovered from the reaction mass, each X being bridgehead halogen.

26. The process of Claim 23 wherein the adamantane nucleus has two alkyl or cycloalkyl substituents each occupying a bridgehead position and containing a total of not more than 10 carbon atoms.

27. The process of Claim 26 wherein each of the substituents are alkyl and each alkyl substituent contains one or two carbon atoms.

28. The process of Claim 27 wherein the halogenation reactant is sodium chloride or sodium bromide.

29. The process of Claim 17 wherein the recovery of product from the reaction mass involves diluting said mass with water.

30. The process of Claim 17 wherein the sulfuric acid strength is 95–105% $H_2SO_4$, said temperature is in the range of 10–30° C., and the molar ratio of halogenating reactant to said adamantane derivative is in the range of 1:1 to 3:1.

31. The process of Claim 30 wherein the halogenating reactant is a metal salt.

32. The process of Claim 31 wherein the halogenating reactant is sodium chloride or sodium bromide.

33. The process of Claim 31 wherein the recovery of product from the reaction mass involves diluting said mass with water.

References Cited

Stetter et al., Ber., vol. 98, pp. 3888–91 (1965).

Stepanov et al., J. Organic Chem. (U.S.S.R.), vol. 2 (1966), pp. 1609–1610.

Gillespie et al., Quarterly Rev., vol. VIII, No. 1 (1954), pp. 40–42.

Geluk et al., Tetrahedron, vol. 24, pp. 5369–77 (August 1968).

LEON ZITVER, Primary Examiner

M. W. GLYNN, Assistant Examiner

U.S. Cl. X.R.

260—648 R